United States Patent
Kudrna et al.

(10) Patent No.: US 10,142,448 B2
(45) Date of Patent: Nov. 27, 2018

(54) SEPARABLE MOBILE DEVICE HAVING A CONTROL MODULE AND A DOCKING STATION MODULE

(75) Inventors: Paul John Kudrna, Naperville, IL (US); Benjamin Michael Finney, Itasca, IL (US); David Kazmierz Szczypinski, Chicago, IL (US); Oleg Los, Buffalo Grove, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 1726 days.

(21) Appl. No.: 13/041,026

(22) Filed: Mar. 4, 2011

(65) Prior Publication Data

US 2012/0225622 A1 Sep. 6, 2012

(51) Int. Cl.
*H04B 7/00* (2006.01)
*H04M 1/02* (2006.01)
(Continued)

(52) U.S. Cl.
CPC ........ *H04M 1/0256* (2013.01); *G06F 1/1626* (2013.01); *G06F 1/1632* (2013.01); *H04M 1/72527* (2013.01); *H04M 1/0235* (2013.01)

(58) Field of Classification Search
USPC ............................ 455/575, 575.1, 41.2, 550.1
See application file for complete search history.

(56) References Cited

U.S. PATENT DOCUMENTS 5,625,673 A * 4/1997 Grewe et al. ............... 455/556.2
5,924,044 A * 7/1999 Vannatta ............. H04M 1/0214
379/433.05

(Continued)

FOREIGN PATENT DOCUMENTS

EP 0659003 6/1995
EP 1355221 A2 10/2003
(Continued)

OTHER PUBLICATIONS

Extended European Search Report dated Aug. 16, 2011. In corresponding application No. 11157067.7.
(Continued)

*Primary Examiner* — Nay A Maung
*Assistant Examiner* — Erica L Fleming-Hall
(74) *Attorney, Agent, or Firm* — Jon Gibbons; Fleit Gibbons Gutman Bongini & Bianco P.L.

(57) ABSTRACT

The technology provides a mobile communication device having separable components, including a control module configured for only short-range wireless communication and a docking station module configured for both long-range wireless communication and short-range wireless communication. The control module includes a touch-sensitive display, a short-range wireless transceiver and a processor that electrically couples the touch-sensitive display and the short-range wireless transceiver. The docking station module includes a docking area that receives the control module, a docking short-range wireless transceiver configured to communicate with the control module, a long-range wireless transceiver that is configured to communicate with a long-range network and a docking processor that electrically couples the docking short-range wireless transceiver and the long-range wireless transceiver. The technology provides a sleek light-weight control module having full functionality of the docking station module.

12 Claims, 6 Drawing Sheets

(51) Int. Cl.
*G06F 1/16* (2006.01)
*H04M 1/725* (2006.01)

(56) References Cited

U.S. PATENT DOCUMENTS

| | | | |
|---|---|---|---|
| 6,216,017 B1 | 4/2001 | Lee et al. | |
| 6,952,617 B1 | 10/2005 | Kumar | |
| 7,054,965 B2* | 5/2006 | Bell et al. | 710/72 |
| 7,079,864 B2 | 7/2006 | Engstrom | |
| 7,120,462 B2 | 10/2006 | Kumar | |
| 7,221,961 B1* | 5/2007 | Fukumoto et al. | 455/557 |
| 7,305,257 B2 | 12/2007 | Ladouceur et al. | |
| 8,437,813 B2* | 5/2013 | Griffin et al. | 455/575.2 |
| 8,483,755 B2* | 7/2013 | Kumar | 455/556.1 |
| 8,605,430 B2* | 12/2013 | Chen et al. | 361/679.55 |
| 2002/0155864 A1 | 10/2002 | Wang | 455/566 |
| 2002/0172336 A1* | 11/2002 | Postma et al. | 379/110.01 |
| 2003/0071791 A1* | 4/2003 | Hanson et al. | 345/169 |
| 2003/0078071 A1 | 4/2003 | Uchiyama | |
| 2004/0190234 A1 | 9/2004 | Lin et al. | |
| 2004/0259587 A1* | 12/2004 | Chadha | 455/550.1 |
| 2005/0101350 A1* | 5/2005 | Wang | 455/558 |
| 2005/0107046 A1 | 5/2005 | Desbarats | |
| 2005/0113157 A1 | 5/2005 | Jaakola | |
| 2007/0167190 A1 | 7/2007 | Moosavi et al. | |
| 2007/0207554 A1* | 9/2007 | Lin | A61B 10/0045 436/514 |
| 2007/0242424 A1* | 10/2007 | Lieu et al. | 361/686 |
| 2008/0200208 A1* | 8/2008 | Llanos et al. | 455/557 |
| 2008/0200257 A1* | 8/2008 | Stelzer | A63F 13/12 463/42 |
| 2008/0304688 A1* | 12/2008 | Kumar | 381/370 |
| 2009/0059907 A1* | 3/2009 | Sindhwani et al. | 370/354 |
| 2010/0195279 A1 | 8/2010 | Michael | |
| 2010/0238119 A1* | 9/2010 | Dubrovsky et al. | 345/169 |
| 2010/0317417 A1* | 12/2010 | Tomohara | G06F 1/1624 455/575.4 |
| 2011/0098087 A1* | 4/2011 | Tseng | 455/557 |
| 2011/0188176 A1* | 8/2011 | Kim | 361/679.01 |
| 2012/0021808 A1* | 1/2012 | Tseng | 455/575.1 |
| 2012/0054401 A1* | 3/2012 | Cheng | G06F 1/1632 710/304 |
| 2012/0084714 A1* | 4/2012 | Sirpal et al. | 715/790 |
| 2012/0225699 A1* | 9/2012 | Griffin et al. | 455/569.1 |
| 2012/0242703 A1* | 9/2012 | Sirpal et al. | 345/649 |
| 2012/0243163 A1* | 9/2012 | Kim | 361/679.15 |
| 2012/0282858 A1* | 11/2012 | Gill et al. | 455/41.1 |
| 2012/0321057 A1* | 12/2012 | Goodman et al. | 379/90.01 |
| 2014/0031081 A1* | 1/2014 | Vossoughi et al. | 455/556.1 |

FOREIGN PATENT DOCUMENTS

| | | |
|---|---|---|
| EP | 2197185 | 6/2010 |
| EP | 2290493 | 3/2011 |
| GB | 2328344 | 2/1999 |
| WO | 9965209 | 12/1999 |

OTHER PUBLICATIONS

Kallender, Paul; "Toshiba Develops Detachable Display," PC World, Mar. 11, 2005; downloaded from http://www.pcworld.com/article/120010/article.html; 2 pages.

Article 94(3) EPC from related European Patent Application No. 11157067.7 dated Aug. 26, 2014; 6 pages.

Canadian Office Action received for Canadian Patent Application No. 2,767,723 dated Feb. 14, 2017.

* cited by examiner

SEPARABLE MOBILE DEVICE HAVING A CONTROL MODULE AND A DOCKING STATION MODULE

FIELD OF THE TECHNOLOGY

The disclosure relates to mobile devices. More particularly, the disclosure relates to mobile devices that are physically separable into a control device and a portable docking station, which wirelessly communicates with the control device.

BACKGROUND

With the advent of more robust electronic systems, advancements of electronic devices are becoming more prevalent. Electronic devices can provide a variety of functions including, for example, telephonic functions, electronic messaging functions and other personal information manager (PIM) application functions. Handheld electronic devices can include mobile stations, such as cellular telephones, smart telephones, personal digital assistants (PDAs), laptop computers, and desktop computers.

Such electronic devices allow the user to perform several functions, including placing voice calls and interacting with content, including text messages, email messages, address books, calendars, task lists, word processing documents and browser content. Existing electronic devices are heavy and bulky. The weight and bulk of existing electronic devices are generally attributable to large-sized components, heavy batteries and connector terminals. What is needed is a technology that separates the electronic device into a light-weight wireless control module that communicates with a docking station module using a short range radio communication device and a docking station module that communicates with a cellular network using a long range radio communication device.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the technology without departing from the scope or spirit of the technology. For instance, features described as part of one embodiment can be used on another embodiment to yield a still further embodiment. Thus, it is intended that the technology cover such modifications and variations that come within the scope of the technology.

Figure 1:
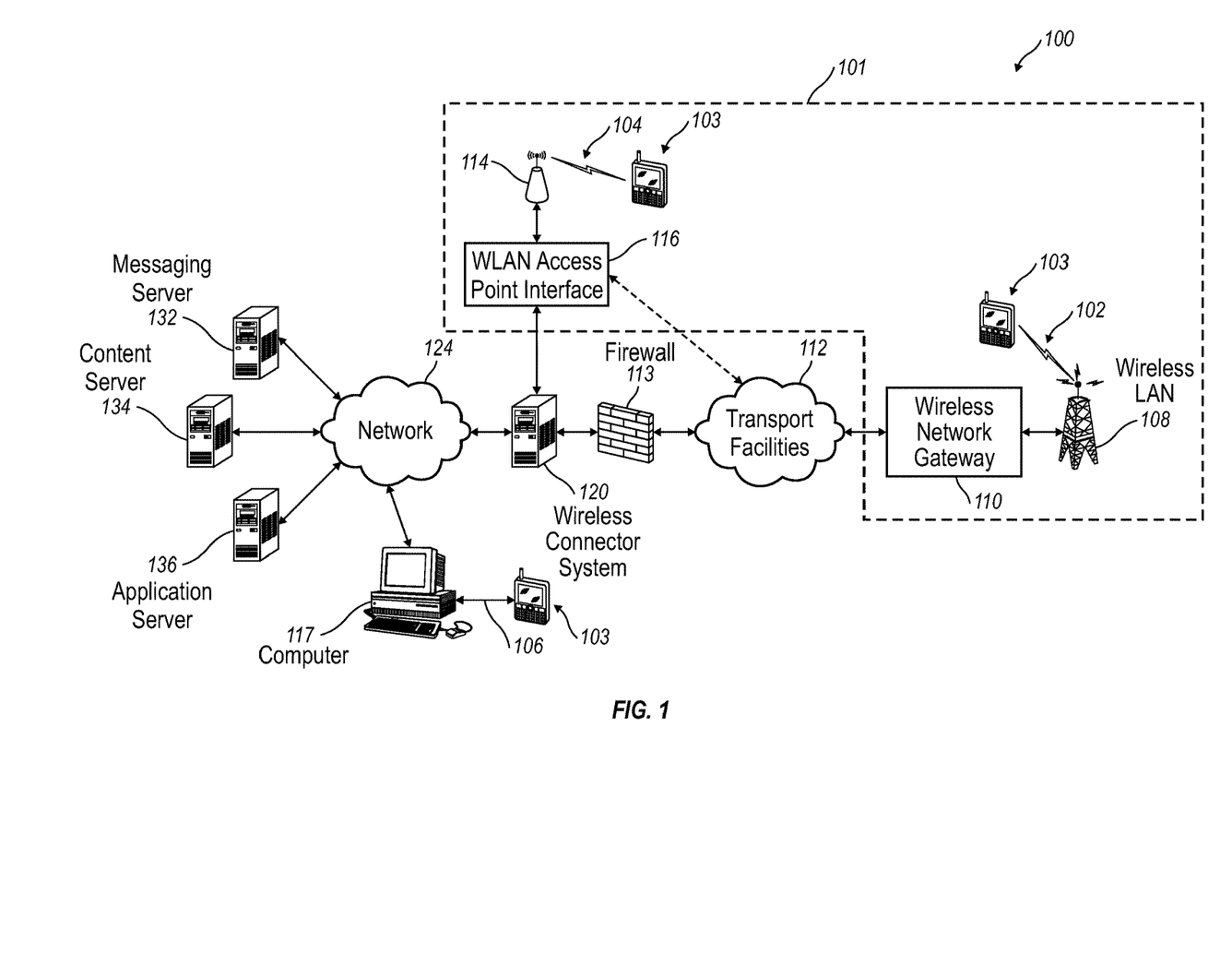
FIG. 1 illustrates a communication system for modular communication devices according to one embodiment of the technology.

FIG. 1 illustrates an exemplary embodiment of an operating environment for a communication system 100 that may include a number of modular communication devices 103, including mobile devices. The communication system 100 may be coupled to the modular communication devices 103 in any of several different ways. The modular communication devices 103 may be coupled to a wireless network 101, such as one or more of a Wireless Wide Area Network (WWAN) 102 and a Wireless Local Area Network (WLAN) 104, among other suitable network arrangements. In some embodiments, the modular communication devices 103 may be configured to communicate over both the WWAN 102 and WLAN 104, and to roam between these networks. In some embodiments, the wireless network 101 may comprise multiple WWANs 102 and WLANs 104, among other configurations.

The WWAN 102 may be implemented as any suitable wireless access network technology. By way of example, but not limitation, the WWAN 102 may be implemented as a wireless network that includes a number of transceiver base stations 108 (one of which is shown in FIG. 1), where each of the base stations 108 provide wireless Radio Frequency (RF) coverage to a corresponding area or cell. The WWAN 102 typically is operated by a mobile network service provider that provides subscription packages to users of the modular communication devices 103. In some embodiments, the WWAN 102 may conform to one or more of the following wireless network types: Mobitex Radio Network; DataTAC; GSM (Global System for Mobile Communication); GPRS (General Packet Radio System); TDMA (Time Division Multiple Access); CDMA (Code Division Multiple Access); CDPD (Cellular Digital Packet Data); iDEN (integrated Digital Enhanced Network); Ev-DO (Evolution-Data Optimized); CDMA2000; EDGE (Enhanced Data rates for GSM Evolution); UMTS (Universal Mobile Telecommunication Systems); HSPDA (High-Speed Downlink Packet Access); IEEE 802.16e (also referred to as Worldwide Interoperability for Microwave Access or "WiMAX"), or various other networks. While WWAN 102 is described herein as a "Wide-Area" network, that term is intended also to incorporate wireless Metropolitan Area Networks (WMAN) or other similar technologies for providing coordinated service wirelessly over an area larger than that covered by typical WLANs.

The WWAN 102 may communicate with a wireless network gateway 110 that couples the modular communication devices 103 to transport facilities 112. The transport facilities 112 couple the modular communication devices 103 to a wireless connector system 120. The transport facilities 112 may include one or more private networks or lines, the Internet, a virtual private network, or any other suitable network, among other transport facilities. The wireless connector system 120 may be operated, for example, by an organization or enterprise such as a corporation, university, or governmental department, among other organizations or enterprises, which allow access to a network 124, such as an internal or enterprise network (e.g., an intranet) and its resources. Alternatively, the wireless connector system 120 may be operated by a mobile network provider. In some embodiments, the network 124 may be realized using the Internet rather than, or in addition to, an internal or enterprise network.

The wireless network gateway 110 provides an interface between the wireless connector system 120 and the WWAN 102. The wireless network gateway 110 facilitates communication between the modular communication devices 103 and other devices (not shown) that may be connected, directly or indirectly, to the WWAN 102. Accordingly, communications sent via the modular communication devices 103 are transported via the WWAN 102, the wireless network gateway 110 and the transport facilities 112 to the wireless connector system 120. Communications sent from the wireless connector system 120 are received by the wireless network gateway 110 and transported via the WWAN 102 to the modular communication devices 103.

According to one embodiment, the WLAN 104 includes a wireless network that conforms to IEEE 802.11x standards (sometimes referred to as Wi-Fi™) such as, for example, the IEEE 802.11a, 802.11b and/or 802.11g standard. One of ordinary skill in the art will readily appreciate that other communication protocols may be used for the WLAN 104, such as, IEEE 802.11n, IEEE 802.16e (also referred to as Worldwide Interoperability for Microwave Access or "WiMAX"), or IEEE 802.20 (also referred to as Mobile Wireless Broadband Access), among other communication protocols. The WLAN 104 includes one or more wireless RF Access Points (AP) 114 (one of which is shown in FIG. 1) that collectively provide a WLAN coverage area.

The WLAN 104 may be a user's personal network, an enterprise network, or a hotspot offered by an Internet service provider (ISP), a mobile network provider, or a property owner in a public or semi-public area, for example. The access points 114 may be connected to an access point (AP) interface 116 that may connect to the wireless connector system 120 directly or indirectly. A direct connection may be provided when the access point 114 is part of an enterprise WLAN 104 in which the wireless connector system 120 resides. An indirect connection may be provided via the transport facilities 112, LAS indicated by the dashed signal line in FIG. 1, if the access point 114 is a personal Wi-Fi network or Wi-Fi hotspot. In this case, a mechanism, such as a virtual private network (VPN), may be used for securely connecting to the wireless connector system 120. The AP interface 116 may provide translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email. Hypertext Transfer Protocol (HTTP), and HTTP Secure (HTTPS) communications to and from a set of managed modular communication devices 103. The wireless connector system 120 also provides administrative control and management capabilities over users and modular communication devices 103 that may connect to the wireless connector system 120.

The wireless connector system 120 allows the modular communication devices 103 to access the network 124 and connected resources and services such as a messaging server 132, for example, a Microsoft Exchange Server®, IBM Lotus Domino®, or Novell GroupWise™ email server; a content server 134 for providing content, such as Internet content or content from an organization's internal servers; application servers 136 for implementing server-based applications, such as instant messaging (IM) applications to modular communication devices 103, and intranet file services; among other connected resources and services.

The wireless connector system 120 typically provides a secure exchange of data (e.g., email messages, personal information manager (PIM) data, and IM data) with the modular communication devices 103. In some embodiments, communications between the wireless connector system 120 and the modular communication devices 103 may be encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the modular communication device 103, and can typically be regenerated by the user on modular communication devices 103. Data sent to the modular communication devices 103 is encrypted by the wireless connector system 120 using the private encryption key retrieved from the user's mailbox. The encrypted data, when received on the modular communication devices 103, is decrypted using the private encryption key stored in memory. Similarly, data sent to the wireless connector system 120 from the modular communication devices 103 is encrypted using the private encryption key stored in the memory of the modular communication device 103. The encrypted data, when received on the wireless connector system 120, is decrypted using the private encryption key retrieved from the user's mailbox.

The wireless network gateway 110 is adapted to send data packets received from the modular communication device 103 over the WWAN 102 to the wireless connector system 120. The wireless connector system 120 then sends the data packets to the appropriate connection point such as the messaging server 132 or the content servers 134 or the application server 136, or a combination of these. Conversely, the wireless connector system 120 may send data packets received, for example, from the messaging server 132 or the content servers 134 or the application servers 136 or any combination of these, to the wireless network gateway 110 that then transmit the data packets to the destination modular communication device 103. The AP interfaces 116 of the WLAN 104 provide similar sending functions between the modular communication device 103, the wireless connector system 120 and network connection point, such as the messaging server 132, the content server 134, the application server 136, or any combination of these.

The network 124 may comprise a private local area network (LAN), metropolitan area network (MAN), wide area network (WAN), the public Internet or combinations thereof. The network 124 may include virtual networks constructed using any of these networks, alone or in combination. Alternatively, the modular communication device 103 may connect to the wireless connector system 120 using a computer 117, such as a desktop or a notebook computer, via the network 124. A link 106 may be provided between the modular communication device 103 and the computer 117 for exchanging information between the modular communication device 103 and a computer 117 connected to the wireless connector system 120. The link 106 may include one or both of a physical interface or a short-range wireless communication interface.

The physical interface may comprise one or a combination of an Ethernet connection, a Universal Serial Bus (USB)

connection, a Firewire™ (also known as an IEEE 1394 interface) connection, or other serial data connections, via respective ports or interfaces of the modular communication device 103 and computer 117. The short-range wireless communication interface may be a personal area network (PAN) interface. The PAN interface is a wireless point-to-point connection implemented to connect the end points without physical cables. The short-range wireless communication interface may include one or a combination of: an infrared (IR) connection, such as an Infrared Data Association (IrDA) connection; a radio frequency (RF) connection, such as a Bluetooth® or IEEE 802.15.1 connection, Ultra-Wideband (UWB) or IEEE 802.15.3a connection, or ZigBee or IEEE 802.15.4 connection; among other communication interfaces.

It will be appreciated that the above-described communication system 100 is provided for illustration purposes only. The above-described communication system 100 may be implemented using any of a multitude of network configurations for use with the modular communication devices 103. Suitable variations of the communication system 100 will be readily appreciated by a person of ordinary skill in the art and are intended to fall within the scope of the present disclosure.

Figure 2:
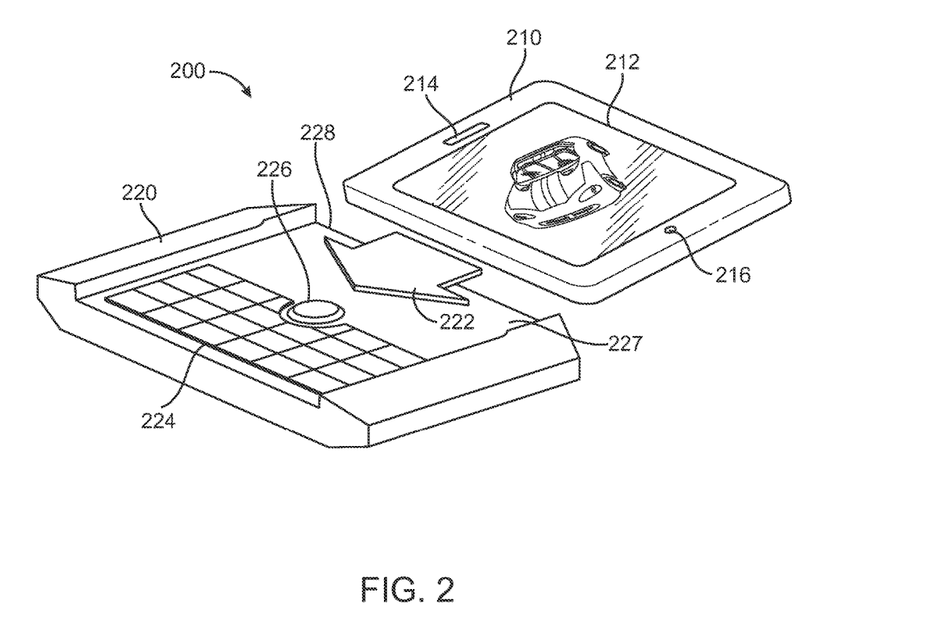
FIG. 2 illustrates a modular communication device in an undocked state according to one embodiment of the technology.
Figure 3:
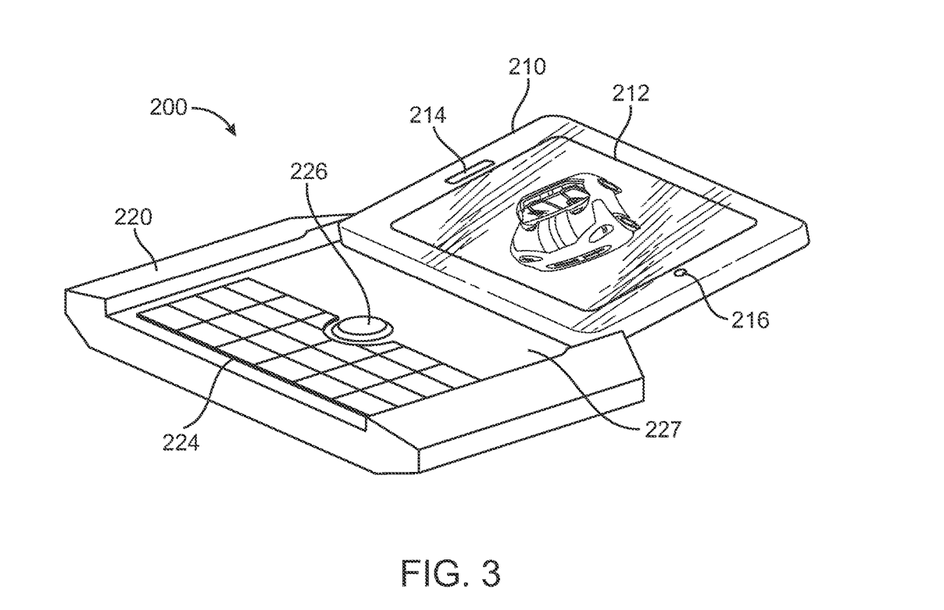
FIG. 3 illustrates a modular communication device in a partial docked state according to one embodiment of the technology.
Figure 4:
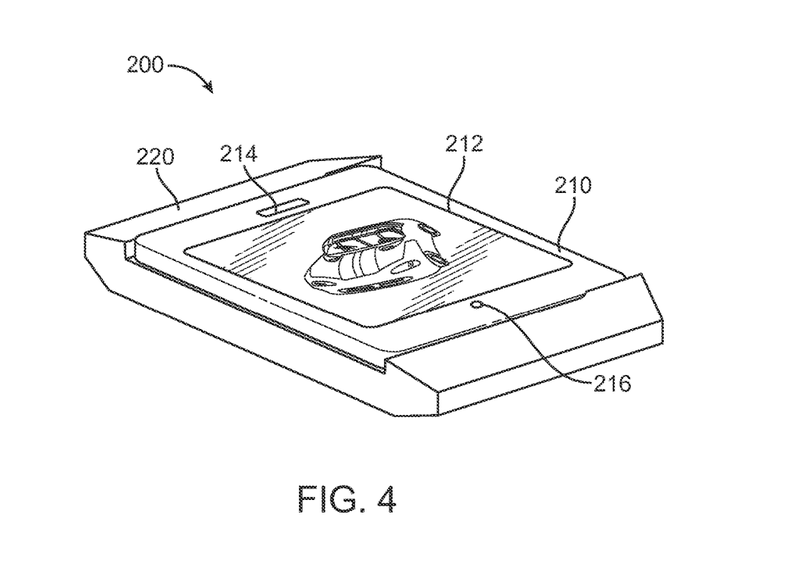
FIG. 4 illustrates a modular communication device in a fully docked state according to one embodiment of the technology.

FIGS. 2-4 illustrate an exemplary modular communication device 200 having a control module 210 and a docking station module 220 that operate together to provide mobile communication functionality. FIGS. 2-4 illustrate the control module 210 and the docking station module 220 positioned in various states, including an undocked state, a partially docked state and a fully docked state, respectively. Various types of coupling mechanisms may be provided to place the control module 210 and the docking station module 220 in the docked, partially docked and undocked states. According to one embodiment, a sliding mechanism may be provided to slide the control module 210 relative to the docking station module 220 in a direction shown by arrow 222 in FIG. 2. The sliding mechanism transitions the control module 210 from the undocked state to the partially docked and the fully docked states. One of ordinary skill in the art will readily appreciate that other coupling mechanisms may be provided to dock and undock the control module 210 relative to the docking station module 220.

FIG. 2 illustrates the control module 210 in the undocked state. In this state, the control module 210 uses a short-range radio device to communicate wirelessly with the docking station module 220. According to one embodiment, the short-range radio communication devices may employ any of various wireless protocols including the IEEE 802.15.x or the IEEE 802.11x protocols for wireless personal networks (WPANs), among other wireless protocols. For example, the short-range radio communication devices may employ the Bluetooth® protocol (IEEE 802.15.1), the UltraWideband (UWB) protocol (IEEE 802.15.3a), the ZigBee protocol (IEEE 802.15.4) or the Wi-Fi protocol (IEEE 802.11x), among other wireless protocols. Additionally, the wireless protocols enable the short-range radio devices to communication with other wireless devices that are located within the communication range, including other infrared devices or radio-frequency devices, among other wireless devices.

As discussed below in detail, the docking station module 220 may further include a long-range radio for wirelessly communicating with long-range communication systems, such as cellular radio communication systems or other tong-range communication systems. According to one embodiment, the technology enables the control module 210 to access long-range communication capabilities of the docking station module 220 using the short-range communication radio communications. In other words, the technology enables the control module 210 to leverage the functionality of large, high power components in the docking station module 220, while benefiting from small, low power components associated with short-range radios.

The technology provides a sleek control module 210 having full functionality of the associated docking station module 220. According to one embodiment, the control module 210 includes small-sized, low-power components while the docking station module 220 includes larger-sized, higher-power components. The control module 210 and the docking station module 220 exchange data wirelessly using short-range radios. The exchanged data includes data accessed by the docking station module 220 using the long-range radio, among other data sources. The docking station module 220 may include a processor or other component that coordinates data exchange between the short-range radio structure and the long-range radio structure, among other structures.

The lower-power components in the control module 210 enable miniaturization through use of smaller, lighter-weight batteries in the control module 210. By contrast, the docking station module 220 is equipped with larger, heavier-weight batteries. The control module 210 is further miniaturized by eliminating bulky connectors and wired input/output interfaces. The elimination of connectors and wired interfaces in the control module 210 provides an additional benefit of a substantially sealed structure that may be water-resistant or even water-proof, if all openings are sealed. According to one embodiment, the control module 210 may include a battery that is not accessible to users and is re-charged via the docking station module 220. To this end, the control module 210 may include contacts, such as insert molded contacts, for charging the battery of the control module.

According to one embodiment, the control module 210 may include several components such as, a display 212, including a touch-sensitive display; a camera (not shown); a video recorder (not shown); an audio recorder (not shown); speakers 214; a microphone 216; external mechanical buttons; status indicators, such as light emitting diode (LED) status indicators; and a navigational tool (not shown); among other components. The control module 210 may be sized for cradling in one or both hands by an operator of the modular communication device 200. The display 212 may present a touch-sensitive virtual keyboard or other data entry interface that enables users to perform data entry, including textual data entry. According to one embodiment, the display content may be rotated within the display 212 from a vertical orientation to a horizontal orientation to provide a full QWERTY keyboard on the display 212. As described below, communication signals originating from or directed to the control module 210 may be processed at the docking station module 220.

Referring to FIG. 3, the control module 210 may be positioned in a partially docked state relative to the docking station module 220. According to one embodiment, the docking station module 220 may include an upper surface 227 having user input components thereon, such as a keyboard 224 and an auxiliary input device or navigation tool 226, among other user input components. The keyboard 224 and the navigation tool 226 may be positioned on the upper surface 227 to enable thumb-actuation of keys of the keyboard 224 and the navigation tool 226. One embodiment provides the navigation tool 226 in the form of an optical joystick that may be utilized to instruct two-dimensional cursor movement in substantially any direction on the display 212. The navigation tool 226 may act as an actuator when depressed like a button. According to another embodiment, the navigation tool 226 may include one of a track pad, a track ball, a touchpad, a pointing stick, a joystick, or a graphics tablet, among other navigation tools. The navigation tool 226 may be placed at an upper portion of the keyboard 224. In this location, the navigation tool 226 may avoid interference during keyboarding.

Referring again to the partially docked state illustrated in FIG. 3, the control module 210 may be situated to overlap the upper surface 227 of the docking station module 220 at any position between the upper portion of keyboard 224 and an upper edge 228 of the upper surface 227. In the partially docked state, the display content may be rotated within the display 212 from a vertical orientation to a horizontal orientation to enable viewing the display content while manipulating the keyboard 224 and the navigation tool 226. Additionally or alternatively, the display 212 may present a touch-sensitive data entry interface or a virtual keyboard that enables users to perform data entry, including textual data entry. According to another embodiment, the battery of the control module 210 may be charged while coupled to the docking station module 220. Otherwise, the control module 210 includes features and is configured to operate as described above with respect to FIG. 2.

Referring to FIG. 4, the control module 210 may be positioned in a fully docked state relative to the docking station module 220. In the fully docked state, the control module 210 may overlap all or substantially all of the upper surface 227 of the docking station module 220. As a result, the control module 210 conceals the user input components provided on the docking station module 220. The display 212 in the fully docked state is configured to provide a touch-sensitive virtual keyboard or other data entry interface that enables users to perform data entry, including textual data entry. According to one embodiment, the display content may be rotated within the display 212 from a vertical orientation to a horizontal orientation to provide a full QWERTY keyboard on the display 212. As described below, communication signals originating from or directed to the control module 210 may be processed at the docking station module 220. Otherwise, the control module 210 includes features and is configured to operate as described above with respect to FIG. 2.

According to one embodiment, the docking station module 220 is a wearable docking device that is carried by the user and operated in close proximity to the control module 210. For example, the docking station module 220 may be fastened by a quick release mechanism to a belt worn by the user. Alternatively, the docking station module 220 may be carried in a user's bag or purse, among being carried in other locations. The docking station module 220 is constructed to be larger than the control module 210 and may be sized for cradling in one or both hands by an operator of the modular communication device 200. During operation, the control module 210 and the docking station module 220 are positioned within a communication range of their corresponding short-wave radios. The docking station module 220 includes components for exchanging data messages with cellular networks or other networks, including the Internet. The docking station module 220 also includes components for performing voice communications, such as mobile telephone calls, using a cellular network or other network. The docking station module 220 further may include integrated input/output electrical contacts to enable wired data exchange and power re-charging, among providing other functions. The docking station module 220 may include a replaceable, high-capacity internal battery that may be employed to re-charge one or more batteries in the controller module 210.

Figure 5:
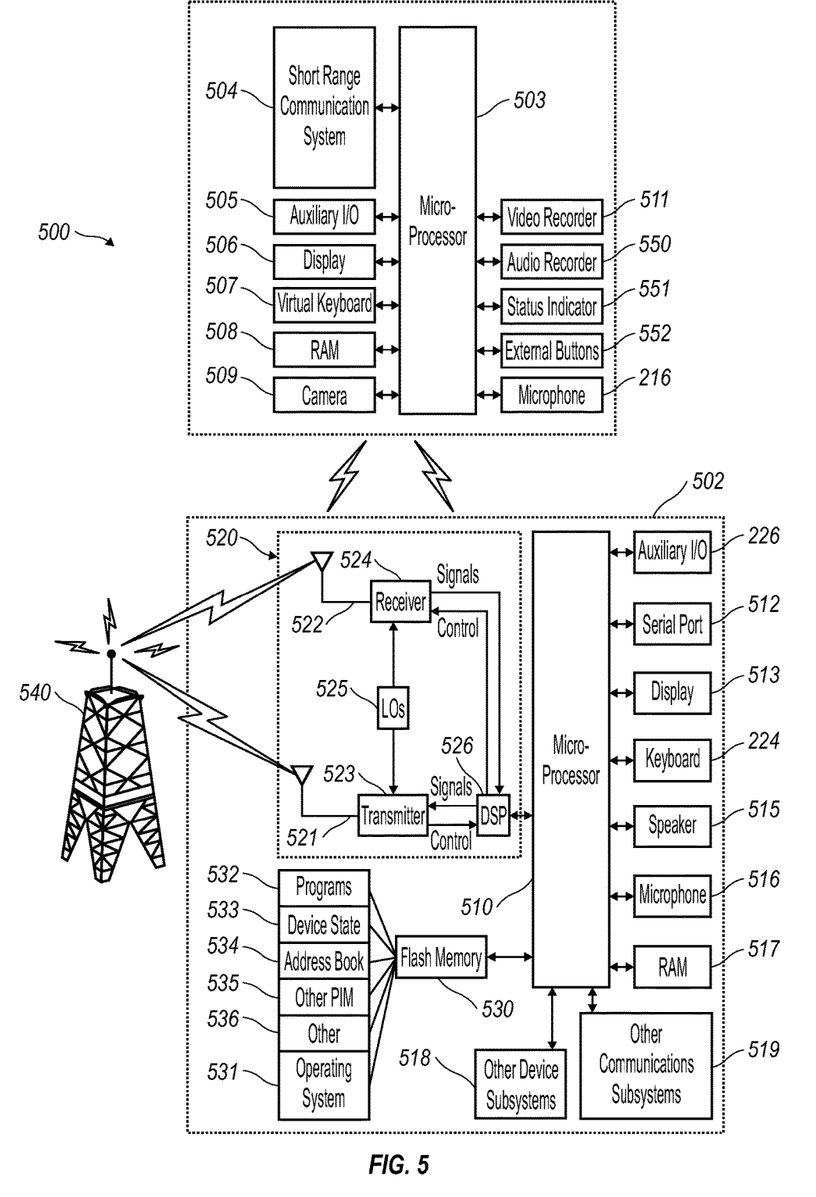
FIG. 5 illustrates a block diagram of the modular communication device illustrated in FIGS. 2-4, according to one embodiment of the technology.

FIG. 5 illustrates a block diagram 500 of the modular communication device 200, in accordance with an exemplary, embodiment. The modular communication device 200 includes a control module block diagram 501 and a docking station module block diagram 502. The docking station module block diagram 202 includes a microprocessor 510 that controls operations of the docking station module 220. A long-range communication subsystem 520 is provided that performs long range communications, including transmission and reception, with the wireless network 530. The microprocessor 510 may be communicatively coupled to an auxiliary input/output (I/O) subsystem 226 of the docking station module 220. In at least one embodiment, the microprocessor 510 may be communicatively coupled to a serial port 512, such as a Universal Serial Bus port, that enables communications with other devices or systems. The display driver 513 may be communicatively coupled to the microprocessor 510 for generating images that are displayed to an operator of the modular communication device 200. When the docking station module 220 is equipped with a keyboard 224, the keyboard 224 may be communicatively coupled with the microprocessor 510. The docking station module 220 may include a speaker 515, a microphone 516, a random access memory (RAM) 517, and a flash memory 518, among other components. These components may be communicatively coupled to the microprocessor 510. Other components may be provided on the docking station module 220 and these other components may be optionally communicatively coupled to the microprocessor 510. Other communication subsystems 519 and other device subsystems 518 are generally indicated as being functionally connected with the microprocessor 510 as well.

The control module block diagram 501 includes a microprocessor 503 that controls operations of the control module 210. The microprocessor 503 is electrically coupled with a short-range communication system 504 that communicates with a corresponding communication subsystem 519 of the docking station module 220. According to one embodiment, the control module 210 does not include a long-range communication system. The microprocessor 503 may be communicatively coupled to an auxiliary input/output (I/O) subsystem 505 of the control module 210. In at least one embodiment, the microprocessor 503 may be communicatively coupled to a touch-sensitive display 506 that displays to an operator of the modular communication device 200. The control module 210 is equipped with a virtual keyboard 507 that is communicatively coupled with the microprocessor 503. The control module 210 may include a speaker 214, a microphone 216, a random access memory (RAM) 508, a camera 509, a video recorder 511, audio recorder 550, status indicator 551, and external buttons 552, among other components. These components may be communicatively coupled to the microprocessor 503. Other components may be provided on the control module 210 and these other components may be optionally communicatively coupled to the microprocessor 503.

The technology provides an exemplary communication subsystem 519 in the docking station module 220 for wirelessly communicating with the control module 210. For example, the docking station module 220 may include a short-range communication system. The short-range communication system 504 of the control module 210 and the communication subsystem 519 of the docking station module 220 may communicate using, for example, a BLU- ETOOTH® (IEEE 802.15.1) protocol, a ZigBee® (IEEE 802.15.4) protocol, an UltraWideband (IEEE 802.15.3a) protocol or a WI-FI® (IEEE 802.11x) protocol, among other communication protocols. For security purposes, the controller module 210 may be synchronized to communicate with a limited number of docking station modules 220. For example, the controller module 210 may be synchronized to communicate with a single docking station module 220.

The microprocessor 510 of the docking station module 220 and the microprocessor 503 of the control module 210 may be configured to perform operating system functions and to enable the execution of programs on the modular communication device 200. In some embodiments, less than all of the above components may be included in the control module 210 and the docking station module 220 of the modular communication device 200. For example, in at least one embodiment, the keyboard 224 of the docking station module 220 may not be provided as a separate component and instead may be integrated with a touch screen as described above.

The auxiliary I/O subsystem 226, 505 may take the form of a variety of different navigation tools, including multi-directional or single-directional navigation tools. The navigation tools 226, 505 may include an optical navigation tool, a trackball navigation tool, a thumbwheel, a navigation pad, a joystick or a touch-sensitive interface, among other I/O interfaces. The navigation tool 226 of the docking station module 220 may be located on the upper surface 227 or may be located on any exterior surface of the docking station module 220. Similarly, the navigation tool 505 of the control module 210 may be located on the display 212 surface or may be located on any exterior surface of the control module 210.

The control module 210 may act as an auxiliary I/O subsystem for the docking station module 220. While the above examples are provided in relation to the auxiliary I/O subsystem 224, 505, other subsystems capable of providing input or receiving output from the docking station module 220 and the control module 210 are considered within the scope of this disclosure. Additional keyboard keys may be provided at the control module 210 and the docking station module 220 to perform function of escape keys, volume control keys, scrolling keys, power switches, or user programmable keys, and may likewise be programmed accordingly.

The keyboard 224 of the docking station module 220 may include a plurality of keys that are physical in nature, such as actuable buttons. Alternatively, the keyboard 224 may be virtual or software in nature. Virtual keys typically represent physical keys on the display 212 of the control module 210 (referred to herein as "virtual keys"). It is also contemplated that user input may be provided as a combination of mechanical and virtual key types. Each key of the plurality of keys may be associated with at least one action, which can be the input of a character, a command or a function. In this context, "characters" are contemplated to exemplarily include alphabetic letters, language symbols, numbers, punctuation, insignias, icons, pictures, or blank space, among other characters.

In the case of virtual keys, the indicia for the respective keys may be shown on the display 212 of the control module 210. According to one embodiment, the virtual keys may be enabled by touching the display 212, for example, with a stylus, finger, or other pointer, to generate the character or activate the indicated command or function. Some examples provide a display 212 that is capable of detecting a touch include resistive, capacitive, projected capacitive, infrared and surface acoustic wave (SAW) touch screens.

Physical and virtual keys may be combined in many different ways, as appreciated by those skilled in the art. In one embodiment, the physical and virtual keys may be combined, such that the plurality of enabled keys for a particular program or feature of the modular communication device 200 are shown on the display 212 in a same configuration as the physical keys. Using this configuration, the operator may select the appropriate physical key corresponding to what is shown on the display 212. Thus, the desired character, command or function is obtained by depressing the physical key corresponding to the character, command or function displayed at a corresponding position on the display 212, rather than touching the actual key on the keyboard 224.

Furthermore, the control module 210 and the docking station module 220 may include components that enable operation of various programs. According to one exemplary embodiment with respect to the docking station module 220, a flash memory 530 may be provided to store an operating system 531, device programs 532 and data. The operating system 531 is generally configured to manage other programs 532. The programs 532 that may be stored in the flash memory 530 and may be executable on the microprocessor 510. The operating system 531 honors requests for services made by the programs 532, through predefined program interfaces, among other request types. More specifically, the operating system 531 typically determines the order in which the multiple programs 532 are executed on the microprocessor 510. The operating system 531 also may determine an execution time allotted for each program 532, manage sharing of the flash memory 530 among the multiple programs, handle input and output to and from other device subsystems 518, among performing other operations.

Additionally, users of the docking station module 220 may interact directly with the operating system 531 through a user interface. Interactions may be facilitated by input devices, including the keyboard 224 and the display 212. In an exemplary embodiment, the operating system 531 may be stored in the flash memory 530. In other embodiments, the operating system 531 may be stored in a read-only memory (ROM) or similar storage element (not shown). As those skilled in the art will appreciate, the operating system 531, device program 532 or parts thereof may be loaded in a RAM 517 or other volatile memory.

In some embodiments, the flash memory 530 may include programs 532 for execution on the docking station module 220, including a device state 533, an address book 534 and a personal information manager (NM) 535, among other programs. Furthermore, the programs 532 and other information 536, including data, may be segregated upon storage in the flash memory 530 of the docking station module 220.

When the docking station module 220 is enabled for two-way communication within the wireless communication network 540, signals are sent and received from a mobile communication service. Examples of communication systems enabled for two-way communication include, but are not limited to, General Packet Radio Service (GPRS) networks; Universal Mobile Telecommunication Service (UMTS) networks; Enhanced Data for Global Evolution (EDGE) networks; Code Division Multiple Access (CDMA) networks; High-Speed Packet Access (HSPA) networks; Universal Mobile Telecommunication Service Time Division Duplexing (UMTS-TDD) networks; Ultra Mobile Broadband (UMB) networks; Worldwide Interoperability for Microwave Access (WiMAX) networks, or other networks that can be used for combined data and voice capabilities or separate data and voice capabilities. For the communication systems listed above, the modular communication device 200 may use a unique identifier to enable the modular communication device 200 to transmit and receive signals from the communication network 540. Other systems may not use such identifying information. With a property enabled modular communication device 200, two-way communication may be performed between the docking station module 220 and the communication network 540.

The docking station module 220 may be configured for two-way communication to both transmit and receive information from the communication network 540. The communication transfer may be performed to or from the docking station module 220. In order to communicate with the communication network 540, the docking station module 220 may be equipped with an integral or internal antenna 521 for transmitting signals to the communication network 540. Likewise, the docking station module 220 may be equipped with another antenna 522 for receiving communication from the communication network 540. According to one embodiment, these antennae 521, 522 may be combined into a single antenna (not shown). As one skilled in the art would appreciate, the antenna or antennae 521, 522 in another embodiment may be externally mounted on the docking station module 220.

When equipped for bi-directional long-range communication, the docking station module 220 may include the communication subsystem 520 that supports the operational needs of the modular communication device 200. The communication subsystem 520 may include a transmitter 523 and a receiver 524, including an associated antenna or antennae 521, 522 as described above, local oscillators (LOs) 525, and a processing module that in the presently described exemplary embodiment is a digital signal processor (DSP) 526.

It is contemplated that communication between the docking station module 220 and the wireless network 540 may be any type of communication that both the wireless network 540 and modular communication device 200 are enabled to support. In general, these communications may be classified as voice and data communications. Voice communication generally refers to communication in which signals for audible sounds are transmitted through the communication network 540 by the modular communication device 200. Data communication generally refers to all other types of communication that the modular communication device 200 is capable of performing within the constraints of the wireless network 540.

FIGS. 1 and 5 are exemplary only and those persons skilled in the art will appreciate that additional elements and modifications may be necessary to make the modular communication device 200 operate in particular network environments. The illustrated embodiments disclose the modular communication devices 200 as smart phones. Alternative embodiments contemplate that the modular communication devices 200 may include personal digital assistants (PDA), tablet computers, laptop computers, desktop computers, servers, or other communication devices capable of sending and receiving electronic messages. According to one embodiment of the technology, the modular communication devices 200 and the corresponding modular device infrastructure 500 may be characterized by an identification number that is assigned to the modular communication device 200. According to one embodiment, the identification numbers cannot be changed and are locked to each device.

Figure 6:
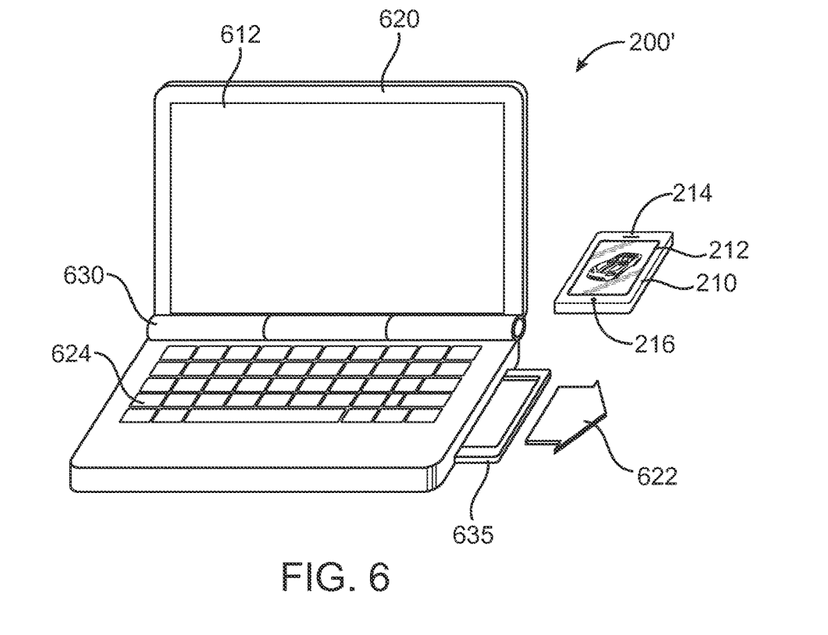
FIG. 6 illustrates a modular communication device in an undocked state according to a second embodiment of the technology.

FIG. 6 illustrates another exemplary embodiment of the modular communication device 200 that includes the control module 210 coupled with a terminal docking station module 620. The control module 210 includes features and operates as described above with respect to FIGS. 1-5. The terminal docking station module 620 is a net book-style device that includes a display 612 and a keyboard 624 coupled together via a hinge 630. The display 612 and the keyboard 624 may be full-size components. A docking tray 635 may be provided at the terminal docking station module 620 to dock the control module 210. The docking tray 635 may be extended in a direction shown by arrow 622 and may be retracted in a direction opposite the arrow.

Figure 7:
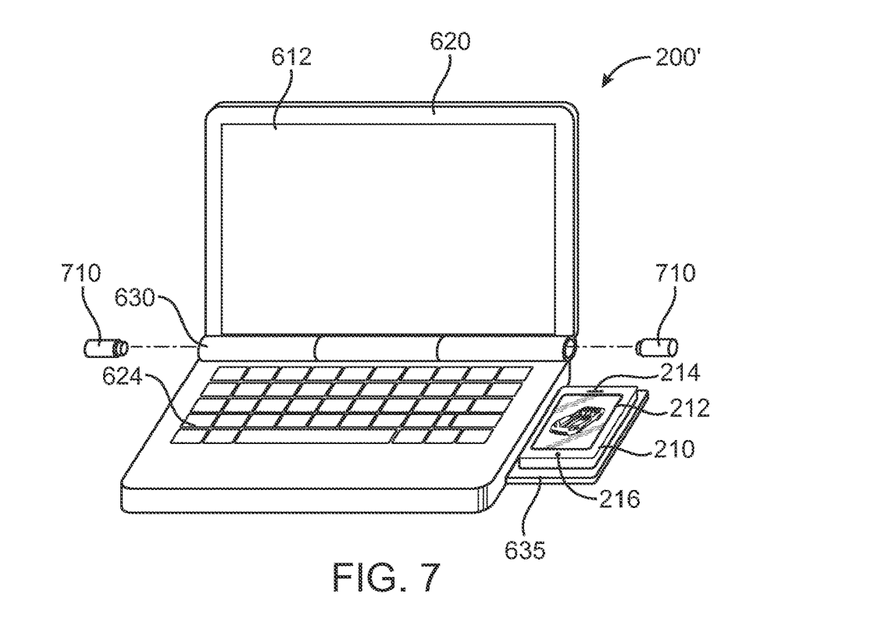
FIG. 7 illustrates a modular communication device in a fully docked state according to a second embodiment of the technology.

FIG. 7 illustrates the control module 210 provided in a docked position on the docking tray 635. The control module 210 functions as a touch pad interface or navigation tool in the docked state. According to one embodiment, the technology provides the navigation tool to instruct two-dimensional cursor movement in substantially any direction on the display 612. The terminal docking station module 620 provides additional functionality of applications for viewing documents, editing documents and graphically displaying documents in a presentation format.

The terminal docking station module 620 may further include high-capacity batteries 710 that maintain a charge for an extended period of time. The docking tray 635 further includes terminals that contact with terminals on the control module 210 to enable the terminal docking station module 620 to re-charge the batteries provided in the control module 210. The control module 210 and the terminal docking station module 620 operate together to provide similar functionality, including smart phone capabilities, as described above with respect to the control module 210 and the docking station module 220.

Figure 8:
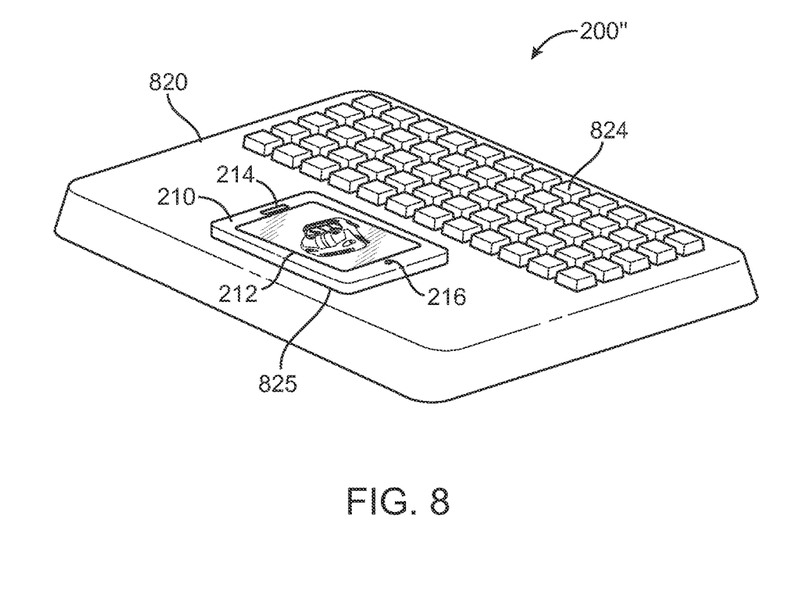
FIG. 8 illustrates a modular communication device in a fully docked state according to a third embodiment of the technology.

FIG. 8 illustrates another exemplary embodiment of the modular communication device 200" that includes the control module 210 coupled with a desktop docking station module 820. The control module 210 includes features and operates as described above with respect to FIGS. 1-5. The desktop docking station module 820 may be a full-size keyboard device 824 that is energized with AC power.

A docking tray 825 may be provided at the desktop docking station module 820 to dock the control module 210. According to one embodiment, the control module 210 functions as a touch pad interface or navigation tool in the docked state. The technology provides the navigation tool to instruct two-dimensional cursor movement in substantially any direction on the display (not shown). The desktop docking station module 820 may include a display driver for providing a graphical output to a full size monitor. The docking tray 825 further includes terminals that contact with terminals on the control module 210 to enable the desktop docking station module 820 to re-charge the batteries provided in the control module 210. The control module 210 and the desktop docking station module 820 operate together to provide similar functionality, including smart phone capabilities, as described above with respect to the control module 210 and the docking station module 220. Various other docking station configurations are contemplated as being within the scope of the technology.

The technology may be implemented using hardware or software in association with hardware. In some embodiments, the software may include firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the technology may take the form of a computer program product that includes program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and MID. Both processors and program code for implementing each as aspect of the technology can be centralized or distributed (or a combination thereof) as known to those skilled in the art.

A data processing system suitable for storing a computer program product of the technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

We claim:

1. A mobile communication device comprising:
    a control module configured for short-range wireless communication, the control module comprising:
        a touch-sensitive display;
        a short-range wireless transceiver;
        a processor that electrically couples the touch-sensitive display and the short-range wireless transceiver; and
    a docking station module configured for long-range wireless communication and short-range wireless communication, the docking station module comprising:
        a body having a recessed docking area that receives the control module in a fully docked state in which the control module flush fits with the body;
        a docking short-range wireless transceiver configured to communicate with the control module;
        a long-range wireless transceiver that is configured to communicate with a long-range network;
        a docking processor that electrically couples the docking short-range wireless transceiver and the long-range wireless transceiver; and
        a physical QWERTY keyboard with a navigation tool that is adapted to provide textual entries to the control module, the QWERTY keyboard defining a rectangular boundary in which all keys of the QWERTY keyboard are enclosed and the navigation tool disposed within the boundary of the physical QWERTY keyboard;
    wherein the docking station module comprises a sliding mechanism for sliding the control module relative to the docking station module;
    wherein the control module and the docking station module operate in an undocked state, a partially docked state and a fully docked state, wherein the sliding mechanism transitions the control module from the undocked state to the partially docked state and the fully docked states;
    wherein, in the partially docked state, the control module is slid partly into the recessed docking area and is positioned to partially overlap the recessed docking area, with the physical keyboard of the docking station module and the navigation tool being accessible and provides keyboard input and cursor control to the control module; and
    wherein, in the fully docked state, the control module is slid completely into the recessed docking area and conceals the physical keyboard and the navigation tool of the docking station module, thereby preventing keyboard input and cursor control from the docking station.

2. The mobile communication device as recited in claim 1, wherein the docking station module further comprises a docking navigation tool.

3. The mobile communication device as recited in claim 2, wherein the control module is adapted to receive at least one of textual entries from the physical keyboard or navigation signals from the docking navigation tool, while the control module is oriented in the partially docked state.

4. The mobile communication device as recited in claim 1, wherein the control module further comprises a virtual keyboard while oriented in the fully docked state and wherein the control module is adapted to receive textual entries from the virtual keyboard, while the control module is oriented in the fully docked state.

5. The mobile communication device as recited in claim 1, wherein the control module further comprises a navigation tool.

6. The mobile communication device as recited in claim 1, wherein the short-range wireless transceiver and the docking short-range wireless transceiver transmit wireless signals less than three hundred feet.

7. The mobile communication device as recited in claim 6, wherein the short-range wireless transceiver and the docking short-range wireless transceiver communicate using one of a Bluetooth protocol, an ultra wideband protocol, a ZigBee protocol or a Wi-Fi protocol.

8. The mobile communication device as recited in claim 1, wherein the long-range network includes a cellular network.

9. The mobile communication device as recited in claim 8, wherein the cellular network includes one of a GSM network, a GPRS network, a TDMA network, a CDMA network, a CDPD network, an Ev-DO network or an EDGE network.

10. The mobile communication device as recited in claim 1, wherein the battery that is replaceable by the user in the docking station module further comprises:
 a high-capacity battery; and
 contacts for charging the battery that is not accessible to the user in the control module.

11. The mobile communication device as recited in claim 1, wherein the control module is in a water-resistant housing.

12. The mobile communication device as recited in claim 1, wherein the control module is in a water-proof housing.

* * * * *